United States Patent
Schuh

(10) Patent No.: US 9,436,602 B2
(45) Date of Patent: Sep. 6, 2016

(54) METHOD AND INDUSTRIAL AUTOMATION COMPONENT FOR INDIRECT MEMORY ADDRESSING

(71) Applicant: Tobias Schuh, Fürth (DE)

(72) Inventor: Tobias Schuh, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 299 days.

(21) Appl. No.: 13/915,234

(22) Filed: Jun. 11, 2013

(65) Prior Publication Data

US 2013/0346717 A1    Dec. 26, 2013

(30) Foreign Application Priority Data

Jun. 14, 2012 (EP) .................................... 12171987

(51) Int. Cl.
*G06F 12/06* (2006.01)
*G05B 19/05* (2006.01)

(52) U.S. Cl.
CPC ............ *G06F 12/06* (2013.01); *G05B 19/058* (2013.01)

(58) Field of Classification Search
CPC .... G06F 12/14; G06F 12/1483; G06F 12/06; G06F 2221/2141; G06F 12/00; G06F 12/02
USPC ......................................... 711/154, 163, 221
See application file for complete search history.

(56) References Cited

U.S. PATENT DOCUMENTS

| | | | |
|---|---|---|---|
| 6,141,726 A | 10/2000 | Dell | |
| 6,799,264 B2 | 9/2004 | Goodhue et al. | |
| 2002/0116597 A1 | 8/2002 | Goodhue et al. | |
| 2011/0087828 A1 | 4/2011 | Lee et al. | |

FOREIGN PATENT DOCUMENTS

| | | |
|---|---|---|
| CN | 1462387 | 12/2003 |
| DE | 19737182 | 3/1999 |
| JP | 2007-219725 | 8/2007 |
| TW | 201113886 | 4/2011 |

OTHER PUBLICATIONS

SPS Grundlagen Seite 2; Unbekannter Autor: SPS Grundlagen Seite 2, Gersch SPS-Technik, Dec. 21, 2009, XP002684072, Gefunden im Internet: URL:http://www.sps.ag/kategorie/sps-grundlagen/page/2/ [gefunden am Sep. 25, 2012] Letzter Absatz: "Indirekte Adressierung"; 2012; Sep. 25, 2012.

*Primary Examiner* — Jasmine Song
(74) *Attorney, Agent, or Firm* — Cozen O'Connor

(57) ABSTRACT

An automation component and method for indirect addressing by a program of an industrial automation component, wherein to accesses a number of cells in the memory, an associated address is ascertained at runtime of the program, such that during writing of the program, an association between a structure and the addresses is created and stored, where at the runtime, for accessing the memory, a relevant element of the structure is ascertained in a first step, the associated address is read from the stored association in a second step, and the memory is accessed via the address in a third step.

13 Claims, 2 Drawing Sheets

| ▽ Access Group1 | BOOL |
| □ Access Group1[1] | "Input_0-0" (E0.0) |
| □ Access Group1[2] | "Flag Bit" (M0.0) |
| □ Access Group1[3] | "Data Block_1" Bool Variable (DB1.DBX0.0) |

| ▽ Access Group2 | INT |
| □ Access Group2[1] | "Output Word0" (AW0) |
| □ Access Group2[2] | "Status Word 10"(MW10) |
| □ Access Group2[3] | "Data Block_2" IntVariable (DB2.DW0) |

METHOD AND INDUSTRIAL AUTOMATION COMPONENT FOR INDIRECT MEMORY ADDRESSING

BACKGROUND OF THE INVENTION

1. Field of the Invention

The invention relates to a method for the indirectly addressing a number of cells in a memory, and to an automation component for use in an industrial automation arrangement for implementing the method.

2. Description of the Related Art

For read or write access to memory cells in a microprocessor architecture, programs use addresses which are mapped by variables, for example. Alongside the direct denotation of variables or other types of addresses, indirect addressing is often also used, such memory access not referencing the relevant cell(s) of a memory directly, but rather the cell(s) to which the memory access refers being ascertained by other variables only at the runtime of the program. Particularly when programs are written for programmable logic controllers (PLC), complex programs frequently involve the use of indirect addressing. This means that the address of the referenced memory area or of the referenced cells in the memory is first determined or formed during the execution of a program, for example, as an index number for an indexed variable or as a "string" for a text-based variable name. The final addresses for memory access operations are therefore first available at runtime, but not during the actual writing of a program for the programmable logic controller.

For the case of the programming languages that are used for programmable logic controllers, e.g., AWL (instruction list) or structured control language (SCL), a programmer has the option of providing indirect addressing for memory areas of data blocks, physical inputs, physical outputs and globally addressable memory areas (flags). In this context, the use of indirect addressing has associated disadvantages on a case-by-case basis, however. By way of example, what are known as "cross references" can be established only with difficulty or not at all at the programming time, i.e., an overview of the access operations for a particular address or memory cell often cannot be formed with the necessary exactness at the programming time because the actual addresses are not generated until the runtime of the program. It is thus barely comprehensible whether and which memory areas are manipulated by indirect addressing, and which are not. In addition, a "protection problem" arises, i.e., when the addresses are formed at the runtime it is necessary for additional measures to ensure that nonvalid or nonexistent memory areas are not mistakenly accessed, which would result in an error at runtime. With respect to the physical interfaces, particularly with respect to the control outputs, it is possible for access operations on such outputs as are either nonexistent or permitted to be manipulated only by other program portions or other subroutines to be formed unintentionally at runtime.

SUMMARY OF THE INVENTION

It is therefore an object of the present invention to optimize the indirect addressing of memories particularly for programmable logic controllers.

In this context, it is a core idea of the solution to the problem that a table or other association which records those addresses that are intended to be accessible to the indirect addressing is stipulated at the actual programming time. By accessing this association, which can be made using an indexed variable, for example, it is a desire to ascertain the physical address or an associated variable for the desired memory area or for the desired memory cells at runtime, so that access operations on other memory cells can be safely prevented by means of the indirect addressing.

These and other objects and advantages are achieved in accordance with the invention, where a method for the indirect addressing of a number of cells in a memory by a program of an automation component in an industrial automation arrangement is provided in which, for the purpose of accessing a number of cells in the memory, the associated address is ascertained at the runtime of the program. Here, in the course of writing the program, an association between a structure and at least a portion of the addresses that can be used by the program is created and stored, where at runtime, for the purpose of accessing the number of cells in the memory, the program ascertains a relevant element of the structure in a first step, reads the address associated with the ascertained element from the stored association in a second step, and uses the address to access the number of cells in the memory in a third step. The indirect addressing using the previously stored and stipulated association makes it possible to reliably avoid an incorrect memory access that results from invalid indirect addressing. Furthermore, the formation of the indirect addresses by the program is simplified because the alphanumeric variable names, which are also complex on a case-by-case basis, and which are used as addresses do not need to be formed as text, but rather can be called using indexing by the association.

It is also an object to provide an automation component for use in an industrial automation arrangement, where the automation component is configured to provide indirect addressing of a number of cells in a memory by a program. Here, the automation component is configured to execute the first, second and third steps of the above-described method. Such an automation component can implement the advantages described in connection with the method.

In one advantageous embodiment, upon access to the number of cells in the memory, alternatively or additionally a physical input or alternatively or additionally a physical output of the automation component or of an input/output unit that is linked to the automation component is read or set. This has the advantage that the access to interfaces of an automation component can be regulated by appropriate inputs in the association. As a result, the other inputs/outputs cannot mistakenly be addressed at runtime.

The method can be used in a particularly universal manner when the address used is a variable that references the desired cells in the physical memory or other addresses. This has the advantage that the variables are simultaneously also accessible to direct addressing at runtime. As a result, the same memory cells can be addressed either indirectly or directly. However, this results both in the variable continuing to be able to be used with a "plain name", which thus has an obvious meaning, and in simple generation of the access being possible using the indirect addressing at runtime. Here, the access security is increased if direct access by the program or at least by portions of the program to the addresses that are referenced in the association can be blocked, which allows direct access to variables or other addresses to be prevented on a case-by-case basis for security-critical memory cells, particularly input/outputs, for example.

Advantageously, the second and third steps of the method are performed by an operating system or by a piece of firmware in the automation component. As a result, the handling of the indirect addressing does not need to be provided in the program itself.

A particularly clear association, and one which can be handled well from the point of view of data engineering, is obtained when the association used is a matrix, particularly a two-dimensional matrix. In this case, the structure advantageously used is a number of elements of an indexed variable or of a one-dimensional array which, in a second column and/or row of the matrix, compares those addresses, variables or descriptors of the memory cells which can be reached by the association.

A structured access concept can easily be converted into reality by grouping the variables within the association to form a plurality of groups and/or by using a plurality of associations that each represent a group. This makes it possible to stipulate rights for addressing and rights for the type of access (e.g., read or write) on a group-granular basis. The rights management becomes particularly clear by virtue of each group comprising at least one separate one-dimensional array as a structure. The descriptors of the possibly identified elements of such one-dimensional arrays can also be easily produced in an automation program. Particularly by the grouping, not only is it possible to set the access authorization for various groups of memory cells or addresses, but the access authorization can advantageously also relate to at least one function, a program block or another program portion, with only functions, program blocks or program portions that are associated with the respective group being approved for defined access to the addresses associated with the group. To this end, it is advantageously also possible to expand the association by a further column or row in which the authorized program portions, program blocks or functions with their respective type of authorization (e.g., read and/or write) can respectively be stipulated on an address-granular basis at the actual programming time.

In one particularly advantageous embodiment of the invention, it is possible to store the structure in a data block or similar object from the program. This has the advantage that data blocks are already known in known programming systems for programmable logic controllers, with the result that the storage and handling thereof can be effected using known means.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention is explained below with reference to the drawing which are simultaneously used to explain an exemplary embodiment of an automation component according to the invention in which.

DETAILED DESCRIPTION OF THE PREFERRED EMBODIMENTS

Figures 1, 2:
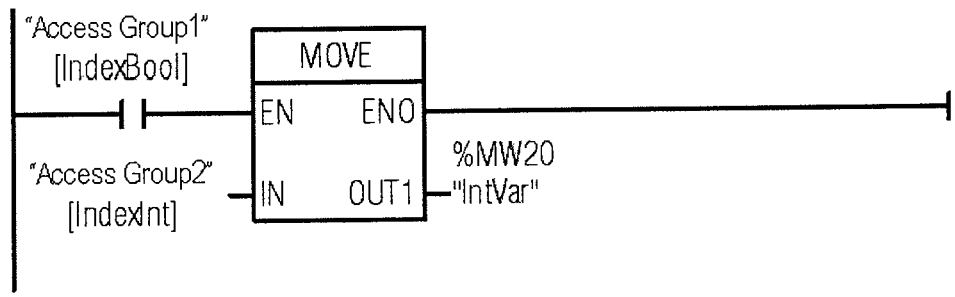
FIG. 1 shows two groups having associations between a respective structure comprising indexed variables and memory areas.
FIG. 2 shows access operations on memory areas using a variable index in the example of a graphically oriented programming language for programmable logic controllers.

FIG. 1 shows an example of an association of addresses for cells for a memory or similar access operations for indirect addressing using the example of two groups, with the addresses in this example being predefined in the manner of a matrix when a program is actually written (engineering time). In this case, Boolean addresses are defined in Access Group1 and integer values are defined in Access Group2. Here, the address E0.0 with the variable name "Input_0-0" and the address AW0 with the variable name "Output Word0" do not denote actual memory cells of a main memory, but rather denote addressable registers of an input/output assembly of a programmable logic controller.

In the present exemplary embodiment, the two matrices Access Group1, Access Group2 are defined in a data block of an automation program. Alternatively (and not shown), the two matrices Access Group1, Access Group2 can have authorizations entered into them on a group-granular basis or an address-granular basis, which authorizations relate, by way of example, to what functions, subroutines or the like are each permitted to have read and/or write access to the relevant addresses.

The structures that are associated with the addresses and the variables thereof in the matrices Access Group1, Access Group2 are the indexed variables Access Group1[$n$], Access Group2[$n$] in the present exemplary embodiment. These structures could also be handled as one-dimensional matrices. The structures that are associated with the addresses E0.0, M0.0, . . . , DB2DW0 in the respectively first association column and with the variables "Input_0-0", . . . , "Data Block_2" in the second column may alternatively (not shown) also comprise a number of freely selectable variable names, however. The indexed variables shown here are advantageous insofar as these descriptors can easily be formed using a simple program, however, by expanding a predefined string, i.e., "Access Group" in this case, by a further character (in this case "1" or "2") for creating the group name, with simple determination of an integer subsequently producing the index [1], . . . , [3].

In one advantageous embodiment, direct access to the addresses "Input_0-0", . . . , "Data Block_2" can be prohibited globally for a program or for individual routines (e.g. subroutines, functions). That is, on a case-by-case basis, the indirect addressing can be prescribed imperatively by the tables shown in FIG. 1.

The parameterization of the associations using the programming software allows the cross references of the variables also to involve an indication of the points of use by indirect addressing, which means that it is possible to produce comprehensibility, which is advantageous particularly for large projects and many access operations on variables.

It is therefore a simple matter to access predefined rows (addresses, memory cells) and to ensure during the actual program writing that these indirectly addressed memory areas actually contain valid data or have the possibility of valid access operations. The indirect access operations which are thus implemented are more typical and can be programmed purely symbolically. This also allows variables in optimized data blocks to be rendered usable for indirect addressing, with the advantages of indirect addressing continuing to be maintained. Optimized data blocks are distinguished in that the addresses of their variables are not visible and therefore the previous indirect addressing cannot be used.

FIG. 2 uses a simple exemplary embodiment of a graphically oriented program language to show the use of addresses via a variable index. In this case, a function block "MOVE" has an activation switch EN ("Enable") which is intended to be actuated by an external input "Input 0-0" (E0.0). However, this input E0.0 is not linked to the input EN of the function block "MOVE" in the program directly, but rather is linked by reference from indirect addressing that refers to an element of the structure Access Group1, which element is referenced using the content of the variable "IndexBool". In this case, the input E0.0 is linked if the index IndexBool of the variable "Access Group1" has the value "1", whereas the status value "Flag Bit" (M0.0) is referenced if the variable IndexBoot contains the value "2" etc.

A similar situation obtains with the value that is connected by the "MOVE" block, said value being connected to the output from Out1 in situations in which there is a logic "1" at the input EN. In this case, under the control of the index variable IndexInt, one of the variables "Output Word0", "Status Word10" or "Data Block_2" is selectively referenced. If the index variables IndexBool, IndexInt have a value other than 1, 2 or 3 when they are used with the variables Access Group1, Access Group2, a runtime error would be recognized during access using indirect addressing.

From the example in FIG. 2, it can be seen that within the user program the addresses of the memory cells or inputs/outputs do not have to be used at all. If the association shown in FIG. 1 is stored in a protected memory area, the hardware structure used and the addresses thereof can remain "invisible" in the source code produced, i.e., the program. This can make unwanted reengineering of a piece of software difficult and prevent unauthorized direct access to the direct addresses.

Figure 3:
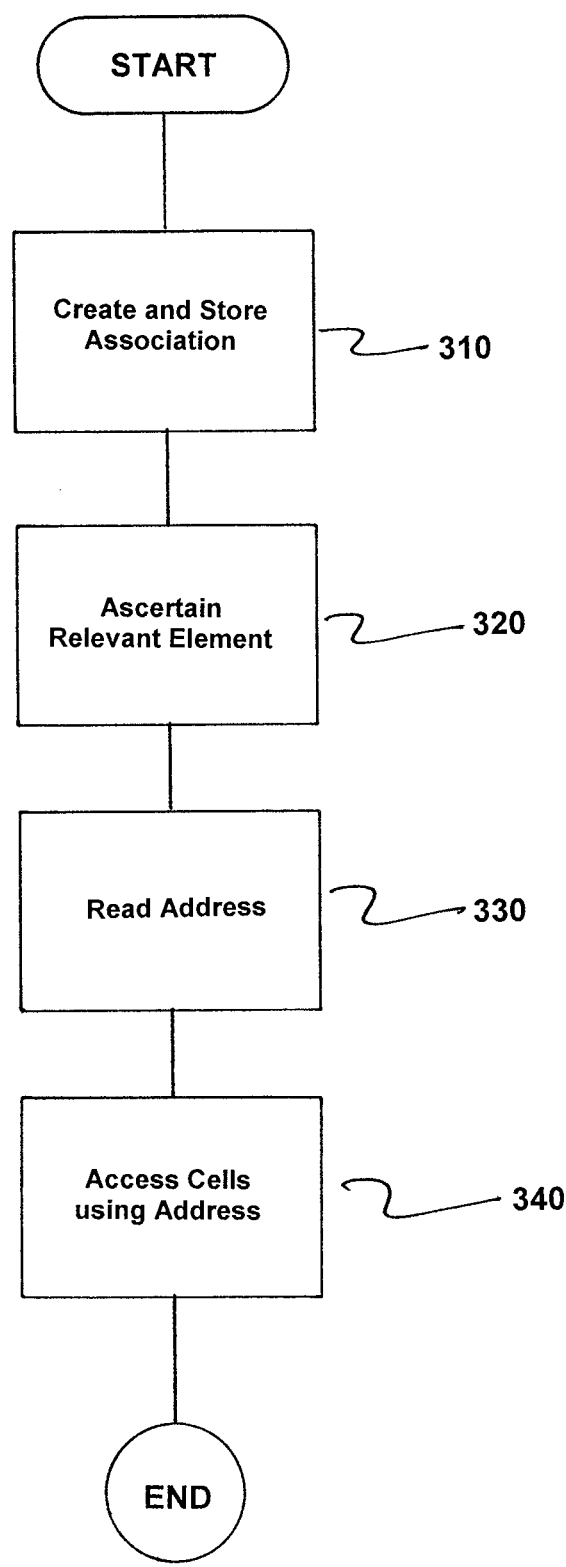
FIG. 3 is a flowchart of the method in accordance with the invention.

FIG. 3 is a flowchart of a method for indirectly addressing a number of cells in a memory by a program of an automation component in an industrial automation arrangement, where an associated address is ascertained at the runtime of the program to access the number of cells in the memory. The method comprises creating and storing, during writing the program, an association between a structure and at least a portion of addresses that are useable by the program, as indicated in step 310.

Next, a relevant element of the structure is ascertained by the program to access the number of cells in the memory at runtime, as indicated in step 320.

The address associated with the ascertained relevant element is then read from a stored association by the program to access the number of cells in the memory at runtime, as indicated in step 330.

The read address is utilized by the program to access the number of cells in the memory at runtime to access the number of cells in the memory, as indicated in step 340.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for indirectly addressing a number of cells in a memory by a program of an automation component in an industrial automation arrangement, an associated address being ascertained at the runtime of the program to access the number of cells in the memory, the method comprising:
   creating and storing, during writing the program, an association between a structure and at least a portion of addresses which are useable by the program, said association comprising a matrix or a table having a column or row in which authorized program portions, program blocks or functions with respective types of authorization are stipulated;
   ascertaining, by the program to access the number of cells in the memory at runtime, a relevant element of the structure;
   reading, by the program to access the number of cells in the memory at runtime, the address associated with the ascertained relevant element from a stored association; and
   utilizing, by the program to access the number of cells in the memory at runtime, the read address;
   wherein said reading and utilizing steps are performed by firmware in the automation component.

2. The method as claimed in patent claim 1, wherein, upon access to the number of cells in the memory, one of (i) at least one physical input and (ii) one of at least one physical output of the automation component and an input/output unit that is linked to the automation component is one of read and set.

3. The method as claimed in patent claim 1, wherein, instead of or in addition to the address, a variable is used which references the number of cells in the memory.

4. The method as claimed patent claim 1, further comprising:
   blocking direct access by the program or at least by portions of the program to the addresses that are referenced in the association is blocked.

5. The method as claimed in patent claim 1, wherein the structure comprises one of a number of elements of an indexed variable and a one-dimensional array.

6. The method as claimed in patent claim 1, wherein at least one of the association is grouped to form a plurality of groups and a plurality of associations which each represent a group are used.

7. The method as claimed in patent claim 6, wherein each group comprises at least one one-dimensional array as a structure.

8. The method as claimed in patent claim 6, wherein at least one of the groups is assigned an access authorization.

9. The method as claimed in patent claim 7, wherein at least one of the groups is assigned an access authorization.

10. The method as claimed in patent claim 8, wherein the access authorization relates to at least one function, one program block or one program portion; and wherein only authorized functions, program blocks or program portions are authorized for accessing the addresses associated with the group.

11. The method as claimed in patent claim 1, wherein the association is stored in a data block or similar object of the program.

12. An automation component for an industrial automation arrangement, the automation component being configured for indirect addressing of a number of cells in a memory by a program,
   wherein the automation component is configured to:
   ascertain, via the program to access the number of cells in the memory at runtime, a relevant element of the structure;
   read, via the program to access the number of cells in the memory at runtime, the address associated with the ascertained relevant element from a stored association comprising a matrix or a table having a column or row in which authorized program portions, program blocks or functions with respective types of authorization are stipulated; and
   utilize, via the program to access the number of cells in the memory at runtime, the read address;
   wherein said reading and utilizing are performed by firmware in the automation component.

13. The automation component as claimed in patent claim 12, wherein the automation component includes at least one of firmware and an operating system;
   wherein at least one of the firmware and the operating system is configured to ascertain addresses stored in an association; and
   wherein the ascertainment is provided using an element, ascertained by the program, of the structure used in the association.

* * * * *